US008396600B2

(12) United States Patent
Hendrickson et al.

(10) Patent No.: US 8,396,600 B2
(45) Date of Patent: Mar. 12, 2013

(54) PREDICTION AND CONTROL SOLUTION FOR POLYMERIZATION REACTOR OPERATION

(75) Inventors: Gregory G. Hendrickson, Kingwood, TX (US); Chih-An Hwang, Humble, TX (US); Ted H. Cymbaluk, Seabrook, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 200 days.

(21) Appl. No.: 12/842,186

(22) Filed: Jul. 23, 2010

(65) Prior Publication Data

US 2012/0022692 A1   Jan. 26, 2012

(51) Int. Cl.
*G01N 15/06* (2006.01)
*G01N 33/00* (2006.01)
*G01N 33/48* (2006.01)
(52) U.S. Cl. .................. 700/269; 422/129; 700/266
(58) Field of Classification Search .................. 422/129; 700/266, 269
See application file for complete search history.

(56) References Cited

U.S. PATENT DOCUMENTS

| 7,109,290 | B2 | 9/2006 | McElvain et al. |
| 7,119,153 | B2 | 10/2006 | Jensen et al. |
| 7,517,947 | B2 | 4/2009 | McElvain et al. |
| 7,531,606 | B2 | 5/2009 | Hendrickson |
| 7,572,875 | B2 | 8/2009 | Jensen et al. |
| 2003/0083444 | A1 | 5/2003 | McElvain et al. |
| 2006/0045823 | A1* | 3/2006 | Shaw et al. .................. 422/139 |
| 2009/0163681 | A1 | 6/2009 | McDaniel et al. |
| 2009/0164046 | A1 | 6/2009 | Benham et al. |
| 2010/0130704 | A1 | 5/2010 | Hottovy et al. |

OTHER PUBLICATIONS

Stienstra et al., Monitoring Slurry-Loop Reactors for Early Detection of Hydrodynamic Instabilities. Chemical Engineering and Processing, Sep. 2005, 44(9), pp. 959-968, Elsevier B.V.

* cited by examiner

*Primary Examiner* — Brian J Sines
(74) *Attorney, Agent, or Firm* — Fletcher Yoder

(57) ABSTRACT

Techniques and systems for the prevention of reactor fouls in polymerization reactors are described. Described embodiments include techniques and systems for performing analyses on reactor data collected over time for the detection of incipient reactor fouling. Techniques are provided for monitoring the state of the reactor as well as for monitoring individual system parameters, including rates of change, for predicting the onset of a reactor foul. In particular, the techniques may be implemented such that predictive proactive control systems may be integrated into polymerization reactor systems to prevent reactor fouling.

9 Claims, 8 Drawing Sheets

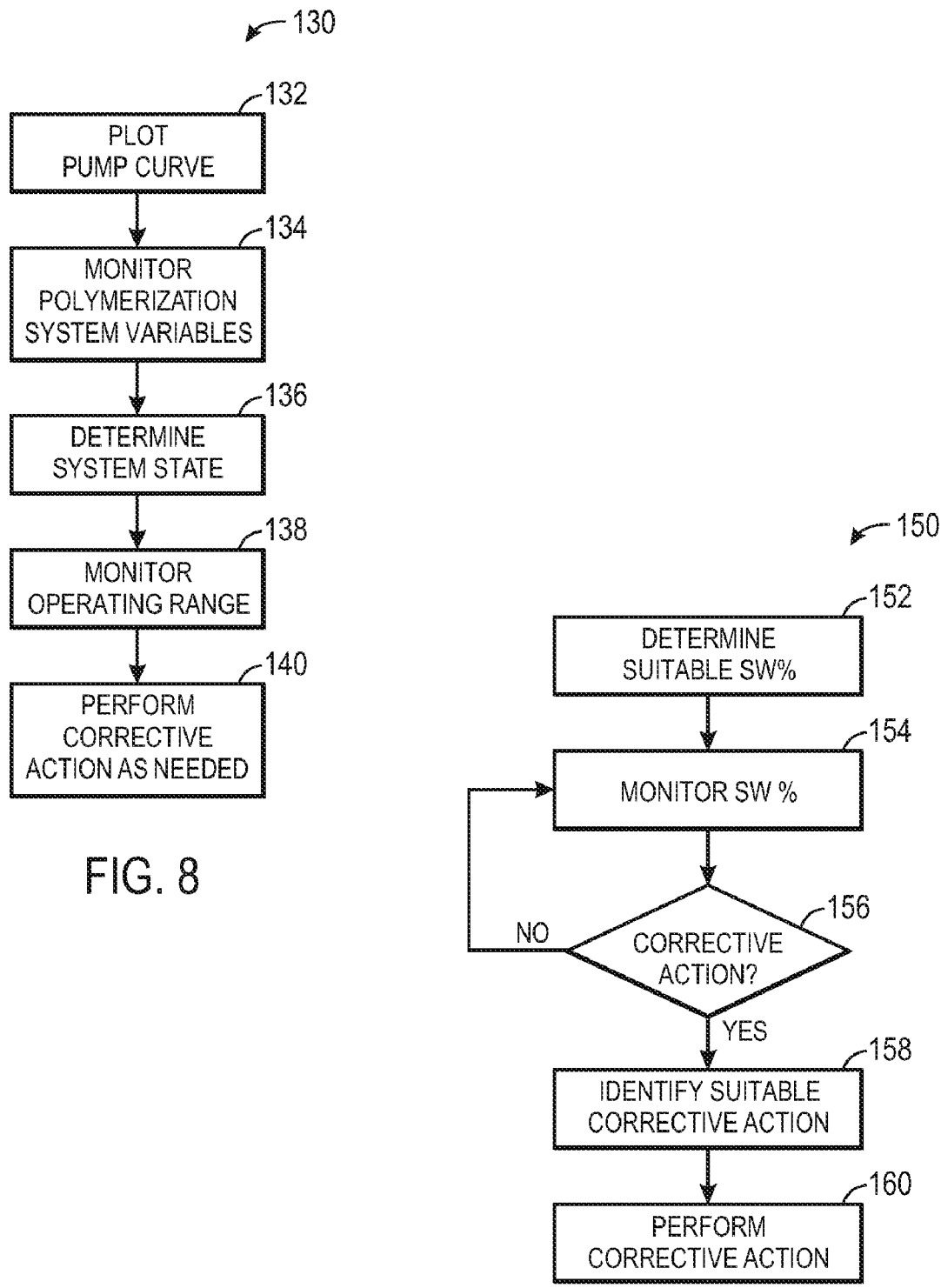

PREDICTION AND CONTROL SOLUTION FOR POLYMERIZATION REACTOR OPERATION

BACKGROUND

The present disclosure relates generally to the production of polyolefins and, more specifically, to the reduction and/or prevention of fouling in polyolefin reactors.

This section is intended to introduce the reader to aspects of art that may be related to aspects of the present technique, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various other consumer and industrial products.

One benefit of polyolefin construction, as may be deduced from the list of uses above, is that it is generally non-reactive with goods or products with which it is in contact as well as with the ambient environment. This property allows polyolefin products to be used in many residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

The raw polyolefin is typically produced in bulk by petrochemical facilities, which have ready access to monomers, such as ethylene, and comonomers such as alpha olefins (e.g., 1-butene or 1-hexene or 1-octene), that serve as the molecular building blocks of the polyolefins to be produced. The polymerization reaction itself is exothermic, or heat-generating, and is typically performed in closed systems, such as a polymerization reactor, where temperature and pressure can be regulated to produce polyolefins having certain desired properties. In some polymerization processes, the components used for polymerization, such as a monomer, a comonomer, and a catalyst that facilitates the polymerization of the monomer and comonomers, are solvated and/or suspended in a diluent. In these cases, the catalyst and the polyolefin formed as a result of the polymerization are typically suspended in the diluent to form a slurry.

However, in some circumstances the polyolefin reactor may foul, such as when the polymerized product is formed on the reactor walls or when the product cannot be maintained as a slurry. Such a foul may result in a loss in heat transfer, such as due to a reduction in circulation or reduced efficiency at a heat exchanger interface, which may impair or completely negate the capacity to maintain the desired temperature within the reactor. A reactor foul may also result in a reduction in the circulation of the reactor contents and/or in a variation from the desired percent solids (measured by volume or by weight) of the reactor slurry. The weight percent solids (solids wt %) in the reactor may be defined as the ratio of polymer to the total reactor contents. To the extent that a reactor foul may result in deviations from the desired reaction conditions, the polymer product produced during such a reactor foul may not meet the desired specifications; that is, the product may be "off-spec." In extreme or runaway fouling situations, control of the reaction may be lost entirely, and the reactor may become plugged with polymer, requiring one to three weeks to clear, during which time the reactor may not be operated.

BRIEF DESCRIPTION OF THE DRAWINGS

Advantages of the present techniques may become apparent upon reading the following detailed description and upon reference to the drawings in which:

FIG. 8 is a process flow diagram of a method for monitoring a system state of a polymerization reactor, in accordance with an aspect of the present disclosure;

FIG. 9 is a process flow diagram of a method for controlling solids weight percent, in accordance with an aspect of the present disclosure;

DETAILED DESCRIPTION OF SPECIFIC EMBODIMENTS

Figure 1:
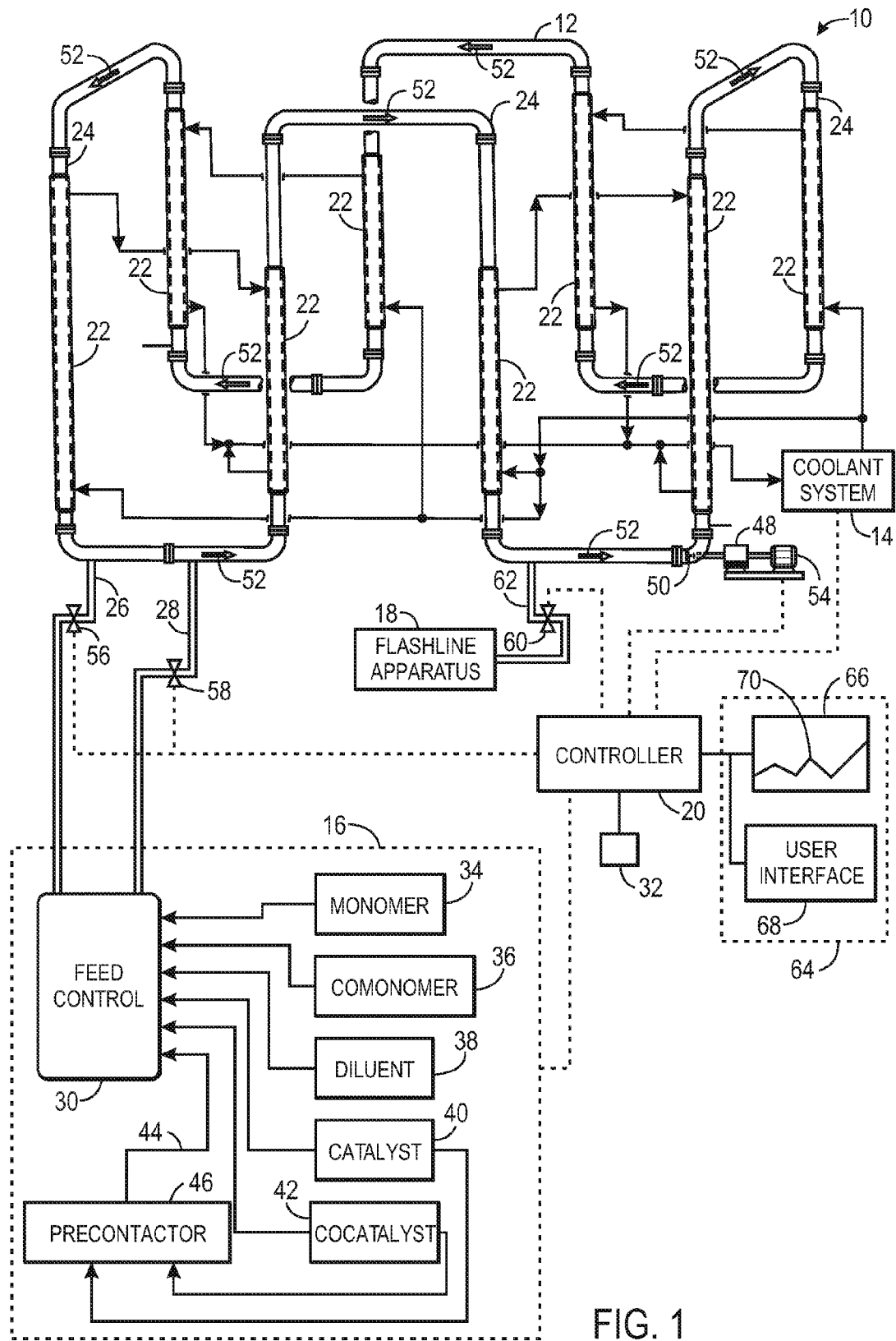
FIG. 1 is an illustration of an embodiment of a loop reactor system with features for controlling polymerization conditions and the prevention of reactor fouls, in accordance with an aspect of the present disclosure.

A reactor foul may occur due to a variety of different factors, depending on the type of polymerization system and circumstances. Depending on the type of reactor foul, the external indications that such a foul exists may include deviations from the set reaction temperature or increased demand on the coolant system to maintain the set temperature value. Similarly, an increase in the temperature differential between the coolant inlet temperature and reactor temperature may be indicative of certain types of reactor fouls, such as those which interfere with the transfer of heat through the reactor walls. Another external indication of a foul may be an increased motor load as the pump attempts to maintain a velocity within the reactor sufficient to keep the polymer and catalyst particles suspended or attempts to compensate for restriction or obstruction of the flow path. Similarly, a high pressure differential may be observed at the pump and may indicate the presence of some fouls.

As an example, fouling may occur when the reactor temperature increases beyond a desired operating range. Such a deviation may result in swelling of the polymer particles and an increased tendency for the particles to agglomerate into larger particles, both which can increase the polymer volume percent in the reactor. The higher volume percent solids may result in a decrease of the circulation rate. To compensate, the reactor circulating pump must work harder to propel the fluid and particles, resulting in a high motor load and a high pressure differential, i.e., $\Delta P$.

Similarly, fouls may occur in which circulation of the reactants and product in the reactor is interrupted or degraded. For example, when reactor solids and monomer concentrations are above desired levels, large polymer particles may be formed which can plug continuous take-off valves or other outlet valves or conduits. The large polymer particles may also settle out of the slurry in the reactor, where they may restrict the flow of slurry. Furthermore, the large polymer particles increase volume percent solids in the reactor, increasing the flow resistance of the slurry and leading to a corresponding high motor load and a high $\Delta P$ as the reactor circulating pump compensates for the increased resistance.

An increase in fine particles of polymer, i.e., "fines," may also result in a form of fouling. In particular, an increased number of fines may increase the viscosity of the slurry due to the corresponding increase in particulate surface area for the same mass fraction of polymer. To compensate for the increase in viscosity, the reactor circulating pump must work harder, resulting in a higher motor load and $\Delta P$.

Another type of fouling that may occur, depending on the reaction environment, is static fouling. Static fouling is typically associated with fines and/or catalysts being held to the reactor wall by electrostatic forces. The catalyst particles and catalyst within the fines facilitate polymerization along the reactor wall, resulting in a film or layer of polymer growing on the reactor wall. As the layer of polymer grows, it decreases the transfer of heat from the reactor to the reactor coolant. The loss of heat transfer resulting from the polymer layer may result in a lowering of the coolant temperature at the inlet to maintain the desired production rate. As a result, the temperature differential, (i.e., the difference between the coolant inlet temperature and reactor temperature or the differential in the coolant inlet and outlet may increase. Furthermore, the layer of polymer restricts the flow of slurry along the reactor wall, resulting in an increased motor load and $\Delta P$ at the circulating pump.

As might be expected, a reactor foul may be indicated by some or all of the factors mentioned above. In response to the various indicators of a foul, a rapid response is typically required to regain control of the reaction. Depending on the foul, such responses may include adjusting the reactor temperature, increasing the addition rate of diluent (such as isobutane), decreasing the addition rate of monomer, adding anti-static agents, and/or decreasing the addition rate of catalyst.

Furthermore, in view of the limited response time which may be provided by the available fouling indicators, it may be desirable to prevent fouls from developing. If control of the reaction cannot be regained, it may be necessary to kill or moderate the reaction (partial kill to slow the reaction) to prevent the reactor from becoming plugged with polymer. Alternatively, to the extent fouls cannot be eliminated, it may be desirable to provide more warning of an impending foul so that less drastic responses may be employed to address the foul.

The present techniques are directed to the detection and reduction and/or prevention of fouls in polyolefin polymerization reactors. In particular, the detection of impending reactor fouls using statistical methods is discussed. In addition, the prevention of reactor fouls by controlling the polymerization reaction based upon monitoring a number of system parameters over time is discussed. Once detected, such impending reactor fouls may be prevented using predetermined adjustments or "corrective actions". The present technique also provides a method for monitoring a loop polymerization process for indications of an impending foul, and methods for preventing the same.

The present techniques may be implemented in conjunction with a variety of polymerization reactions, such as may be carried out in different types of polymerization reactors. One embodiment of a reactor system 10 for carrying out polymerization reactions may include a loop slurry reactor 12, as depicted in FIG. 1, which may be used to polymerize monomers (e.g., ethylene, propylene) and comonomers (e.g., 1-butene, 1-hexene, 1-octene). For simplicity, the loop slurry reactor 12 will be discussed herein, though it is to be understood that the present techniques may be applied to other types of polymerization reactors susceptible to fouling, such as boiling liquid pool, stirred tank and gas phase reactors. Indeed, any type of polymerization reaction or reactor may benefit from the present techniques.

With regard to FIG. 1, the system 10 includes a loop reactor 12, a coolant system 14, a feed system 16, a flashline apparatus 18, and a controller 20, among other features. The coolant system 14 is configured to remove heat from the loop reactor 12 via reactor jackets 22 based upon temperature measurements, for example measurements at reactor hot spots 24. While the hot spots 24 are illustrated as being measured at bends or elbows in the reactor 12, it should be noted that the locations of the reactor hot spots 24 may vary. The locations may vary depending on the reactor layout, design, operating conditions and other factors. During operation, the feed system 16 introduces polymerization components into the polymerization reactor 12 via inlets 26 and 28, and may include features configured to control the rate of addition of the various polymerization components, such as a feed control system 30. In some embodiments, the controller 20 may be in communication with the feed system 16, such that among other features, the controller 20 may include a memory containing computer code 32 configured to control the feed control system 30. For example, a processor within the controller 20 may execute the code 32, which may contain one or more algorithms capable of adjusting conditions within the reactor 12 and/or performing analyses as described below. Such conditions may include temperature, flow rates of the polymerization components, and so forth. As mentioned, the feed control system 30 may control the flow of a number of polymerization components into the reactor 12, such as a monomer 34, a comonomer 36, diluent 38, catalyst 40, cocatalyst 42, and so forth. Further, the feed control system 30 may control, during operation of the system 10, a feed 44 which has been directed from a precontactor 46.

During operation, one or more of the polymerization components may flow through the loop reactor 12, which generally includes segments of pipe connected by smooth bends or elbows. For example, the reactor 12 may be used to carry out polyolefin polymerization under slurry conditions in which insoluble particles of polyolefin, such as polyethylene, are formed in a fluid medium and are suspended as a slurry until removed. The fluid medium may include diluent (such as isobutane), monomer (e.g., ethylene, propylene, etc.), comonomer (such as 1-butene, 1-hexene, 1-octene), co-catalysts (such as alkyl aluminum reagents), activating agents and/or solid supports (solid oxides such as solid super acids (SSA's)), chain transfer agents, molecular weight control agents (e.g., hydrogen), and any other desired co-reactants or additives. Any one of these polymerization components may be added to the reactor interior by the feed system 16 via the inlets 26 and 28 prior to and/or during a polymerization reaction. Likewise, a particulate catalyst may be added to the reactor 12 and suspended in the fluid medium to initiate and/or maintain the desired polymerization reaction. The catalyst can be any suitable catalyst for polymerizing the monomers that are present. An example of such a catalyst is a metallocene/solid super acid (SSA) catalyst system, a Ziegler-Natta catalyst system, a chromium oxide on solid support catalyst system, and so forth. Any of these catalysts may be used to polymerize the monomer and comonomer(s).

During operation, a motive device, such as a pump 48, circulates the fluid slurry in the reactor 12. For example, the pump 48 may be an in-line axial flow pump with a pump impeller 50 disposed within the interior of the reactor 12 configured to propel the fluid medium through the closed loop of the reactor 12, as depicted by arrows 52, at sufficient speed to keep solid particulates, such as the catalyst or polyolefin product, suspended within the fluid medium. For example, in a loop slurry reactor producing polyethylene, an average circulation rate of approximately 30-45 feet/second is typically sufficient to maintain the suspension of polymer product and catalyst as a slurry. The impeller 50 may be driven by a motor 54 or other motive force.

The reaction conditions within the reactor 12 may be selected to facilitate the desired degree of polymerization and the desired reaction rate while keeping the temperature below that which may result in a reactor foul. Due to the exothermic nature of the polymerization reaction, the cooling jackets 22 may be provided around portions of the closed loop system. During operation, a cooling fluid may be circulated within the cooling jackets 22 as needed to remove the generated heat and to maintain the temperature within the desired range, such as between approximately 150° F. to 250° F. (65° C. to 121° C.) for polyethylene.

As the polymerization reaction proceeds within the reactor 12, the monomer (and comonomer, if present) polymerizes to form polymers that are substantially insoluble in the fluid medium at the reaction temperature, thereby forming a slurry of solid particulates within the medium. The human operator and/or the controller 20 may perform operations to maintain the balance between the amount of polymerization components added to the reactor and the amount of slurry withdrawn. For example, a human operator and/or controller 20 may actuate the valves 56 and 58 corresponding to inlets 26 and 28, respectively. The valves 56 and 58 may be, in some situations, fully or partially opened, and/or fully or partially closed. Likewise, the human operator and/or controller 20 may actuate a valve 60 that at least partially regulates an amount of slurry withdrawn from the reactor 12 via continuous take-off 62. As such, the solid polyolefin particulates may then be removed from the reactor 12. In some embodiments, configurations other than the continuous take-off 62 may be possible, such as the use of a settling leg rather or a pressure take-off valve. In the flashline apparatus 18, the polyolefin discharged from the reactor 12 may be extracted from the slurry and directed for further processing, such that the product may be formed into parts or products for personal, commercial, and/or industrial use.

By keeping the temperature, pressure, percent by weight solids, percent by volume solids, slurry circulation rate, and other reaction conditions within the desired ranges and by using a suitable polymerization catalyst, the polyolefin produced by the reactor 12 may have properties desirable for a number of end uses, such as those described above. As discussed previously, however, various types of reactor fouls may occur that effectively limit or impair the control of reactor conditions, such as temperature, slurry circulation rate, and/or the percent of solids in the slurry (by weight or by volume). If not prevented or addressed, such reactor fouls may lead to undesirable economic and commercial results, such as off-spec product and/or reactor down-time.

In some situations, it may be desirable to implement the described features into a partially or fully automated and substantially continuous polymerization system, such as the polymerization system 10. FIG. 1 illustrates the polymerization system 10 as configured to monitor various system parameters and provide corrective action to prevent reactor fouls. The polymerization system 10 may further include, in addition to those features noted above, a workstation 64 containing a display 66. The supervisory control workstation 64 may also include a user interface 68 that the human operator may use to monitor and control, respectively, the operational parameters within the loop reactor 12.

The human operator may view the display 66, which may be configured to display a variety of information about the loop reactor 12, coolant system 14, feed system 16, and so forth. Further, the display 66 may show information related to system curves, energy balances, mass balances, dynamic balances, time, future conditions, predictive data and the like, which are described in further detail below. The display 66 may include a single screen or a number of screens wherein a series of data and/or other operational information may be displayed. Accordingly, the workstation 64 may be configured to retrieve the data which is displayed on the display 66 from any number of sources, including reactor hot spots 24, take-off 62, adjustment valves 56 and 58 for inlets 26 and 28, cooling jackets 22, coolant system 14, feed system 16 (and its inclusive features), and/or the flashline apparatus 18, and may be communicatively coupled to each.

Workstation 64 may include analysis circuitry or may be configured to execute analysis routines for performing analyses, such as an analysis of a system curve and a pump curve and, analyses of rate changes of monomer, solids, and the like within the polymerization reactor, and/or dynamic balance analyses, all of which are discussed in further detail below. In some embodiments, the controller 20 may be configured to perform these tasks, either in concert with the workstation 64 or in lieu of the workstation 64. Therefore, there may be situations where the controller 20 interfaces with the workstation 64, such as when data is shown on the display 66, or when the controller 20 tasks the workstation 64 to perform one or more analysis routines for preventing and/or predicting a foul.

In some embodiments, the workstation 64 and/or controller 20 may be configured to accept media, such as solid-state memory, hard drives, and discs such as compact discs, digital video discs, and the like. The storage media may contain code configured to perform the analyses and perform the adjustments to the polymerization system, which are described below. Further, workstation 64 may include, within the user interface 68, one or a number of computers and computer periphery that allow the human operator to interface with the workstation 64. The periphery may include features such as a printer, a mouse, a keyboard, a device configured to provide user-perceivable indications of incipient reactor fouls, and so forth. Such user-perceivable indications may include auditory, visual, and/or tactile indications. As noted above, the workstation 64 and/or controller 20 may be configured to monitor one or more reactor operating conditions, such as pump power, temperature, pressure, and so forth. Further, the workstation 64 and/or controller 20 may be configured to monitor the current state of the polymerization components within the polymerization reactor 12, such as the solids weight percent, the monomer weight percent, the catalyst weight percent, the feed rates of some or all of the polymerization components, and the like.

The display 66 may show a result 70 of the analysis for review by the human operator. If, based on the displayed results 70, the human operator decides a corrective action is to be taken, the human operator may adjust the reactor conditions. An example adjustment may include reducing the solids in the reactor 12 by increasing the feed of diluent through the inlet 56 and/or the inlet 58 or by reducing the flow of catalyst, reactants, and so forth to the reactor 12. Similarly, the human operator may choose to increase the temperature of the reactor 12, such as by decreasing the amount of coolant delivered to the cooling jackets 22 or adjusting the coolant supply temperature in response to the displayed results 70, for example, solids collection on the inner wall of the reactor. While these operations may be performed by circuitry or routines accessible to the human operator at the workstation 64, or performed substantially automatically by the controller 20, the human operator may also manually actuate or adjust valves 56, 58, and/or 60 in some embodiments.

As noted above, the monitoring, detection, and response scheme may be fully or partly automated. In some embodiments, the pump power or other reactor operation data may be provided to the controller 20, which may be a suitably configured general or special purpose computer system. During operation, if a predictive indicator, such as a large increase in the amount of solids within the reactor 12 is detected, the controller 20 may adjust the operation of the reactor 12 in accordance with a preconfigured response, as discussed below. As an example, if a reactor foul is predicted, the controller 20 may perform operations to reduce reactor solids, such as by increasing the rate of diluent feed, by reducing the addition of reactants or catalyst, or by increasing the influx of additives, such as anti-static agents. In one embodiment, valve control circuitry or code contained within the workstation 64 and/or controller 20 generate signals that adjust the flow of diluent, solids, reactant, catalyst, and/or additives by adjusting valves 56, 58, and/or 60.

According to the present technique, it may be desirable to predict impending fouls sufficiently in advance that preventative action may be taken, which is typically less severe than the action that is suitable for recovery from an ongoing foul. For example, predictive techniques may utilize one or more reactor or reaction characteristics to predict a reactor foul prior to onset so that preventative steps may be taken. One such technique described herein utilizes statistical analyses of reactor operational data and constructed models to predict reactor fouls. For example, reactor operation data, such as temperature, pressure, the addition rate of reactants and/or catalysts, and the power consumption of the pump are examples of reactor operating conditions that may be monitored and measured over time, either constantly or at intervals. This data may be analyzed to detect trends or patterns in the data which allow predictions to be made about future conditions, such as future reactor operating conditions.

One predictive solution according to the present technique may monitor the flow of slurry through the reactor 12. Based on the results of such monitoring, the predictive solution may indicate whether an incipient foul is present. For example, in some aspects, stable loop slurry reactor operation may be predicated by suspension and circulation of the growing polymer granules in the reactor diluent. In cases where the growing polymer granules cease to be suspended (and thus circulated) in the reactor 12, a reactor foul may almost certainly occur. In certain embodiments, solid particle suspension in the reactor slurry may be accomplished by maintaining sufficient circulation velocity for the polymer particle size and solid particle concentration in the reactor 12. The polymer particle size may often be largely determined by the selected catalyst particle size and the polymer yield on each catalyst particle. Consequently, in one embodiment, it may be more efficient to monitor and control some or all of the system parameters rather than attempt to control polymer particle size.

In practice, stable slurry circulation may often be achieved by limiting the solids concentration as measured by the volume fraction of solids in the reactor 12. If the solids concentration (volume fraction) becomes too large for the given circulating velocity, a reactor foul may occur. Thus, the stable operation of the loop reactor 12 may include determining incipient fouling indicators for the given polymer grade and installed reactor circulating pump 48 which is configured to motivate the slurry through the reactor 12 at a desired velocity.

Existing techniques for predicting fouling based on slurry flow include "wide banding" (large deviations from the mean) of the reactor circulating pump power consumption and wide banding of the reactor slurry density indicator. Oftentimes, wide banding may be associated with hydrodynamic instabilities. However, it is now recognized that wide banding of individual system parameters may not necessarily indicate an incipient reactor foul. As such, it is now recognized that a need may exist for simple yet statistically relevant criteria to be developed such that reactor fouls may be predicted and/or prevented.

Figure 2:
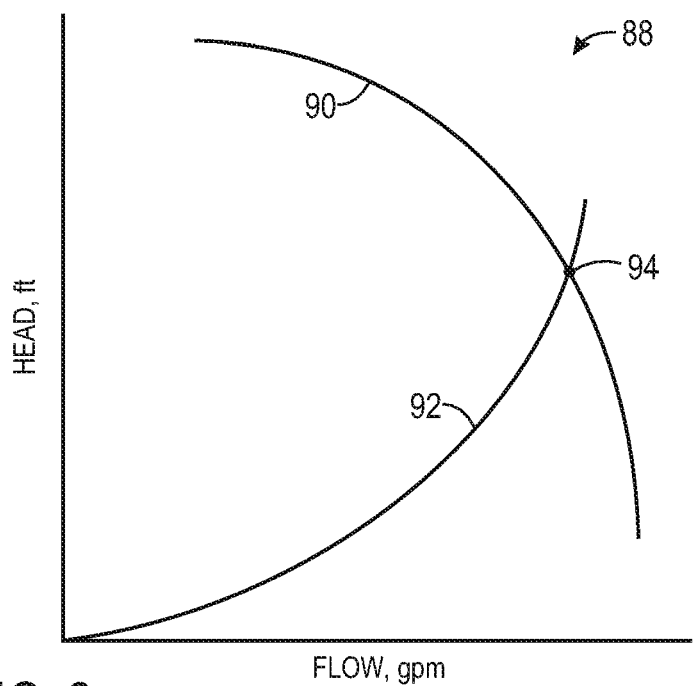
FIG. 2 is an illustration of a plot of a system curve versus a pump curve for the determination of slurry circulating velocity, in accordance with an aspect of the present disclosure.

Moving now to FIG. 2, an illustration of a plot 88 used to determine the velocity of the slurry circulating through a reactor, such as the loop reactor 12, is depicted. According to the present disclosure, the plot 88 may be useful in the detection and/or prediction of an incipient reactor foul. The plot 88 includes a circulating pump curve 90, which is determined by the type and configuration of the pump 48, and a system curve 92, which is determined by various operational conditions within the reactor 12. As an example, the slurry circulation velocity may be determined by the intersection of the reactor circulating pump curve 90 with the system curve 92.

The pump curve 90 may be determined by the design of the pump 48, and may be supplied by a pump vendor or pump manufacturer. In FIG. 2, the pump curve 90 shows decreasing head with increasing flow. It should be noted that the pump curve 90 is representative of a typical pump curve supplied by a pump vendor. In the illustrated embodiment, the system curve 92 intersects with the pump curve 90, and may be determined by a pressure loss within a reactor system. For example, a pressure loss resulting from a buildup of solids within the reactor 12 may result in the data that forms the system curve 92. The pressure loss within the reactor 12 may have a number of causes, such as friction as a function of flow. The pressure loss may also depend on a number of variables including system geometry (e.g., number of legs in the reactor 12, diameter of the reactor 12, the dimensions of one or more curvatures in the reactor 12) and slurry physical properties (e.g., solids concentration, particulate size), to name a few. The intersection of the system curve 92 with the pump curve 90 may define an operating point 94. According to the present embodiments, the operating point 94 may be a point that designates the current state of the reactor 12.

Figure 3:
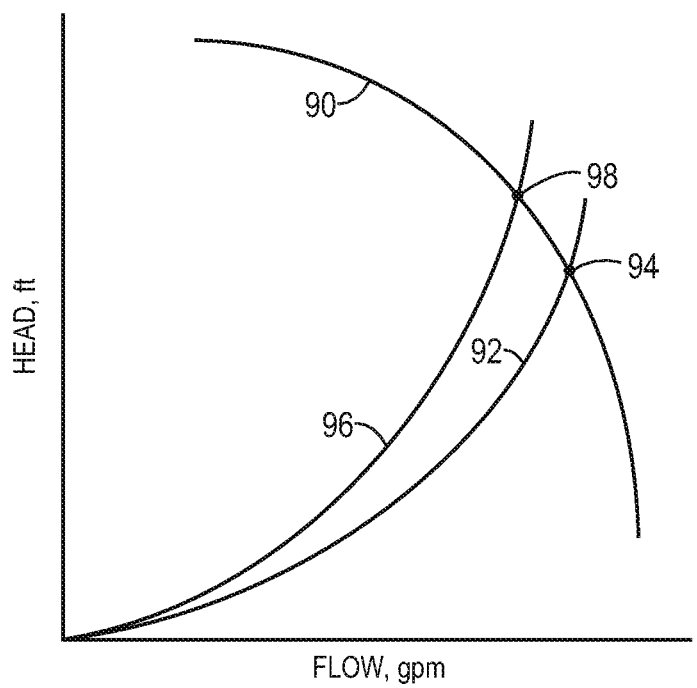
FIG. 3 is an illustration of a plot of a system curve change over a path substantially constrained by a pump curve for the monitoring of system changes, in accordance with an aspect of the present disclosure.

In certain embodiments, as illustrated by FIG. 3, the system curve 92 may change, which results in a concomitant change in the operating point 94. For example, a new system curve 96 may represent an increased solids concentration within the reactor 12 relative to the concentration depicted by the system curve 92. In one embodiment, as the solids concentration with the reactor 12 increases, the pump flow may decrease while the pump head increases. In such an aspect, the operating point 94 would move to a new operating point 98. Thus, in aspects of the current technique, a variety of changes that occur within the reactor 12 may be represented by the movement of the operating point 94 along a path that is constrained by the pump curve 90. It should be noted that while two discrete points depict changes within the reactor 12, that the movement from point 94 to point 98 may be in a substantially continuous fashion. That is, the movement of the operating point may be a progression over time, rather than hopping. Indeed, the distance between the operating points measured at different times may be proportional to the time lapse in between measurements, as discussed in further detail below.

Figure 4:
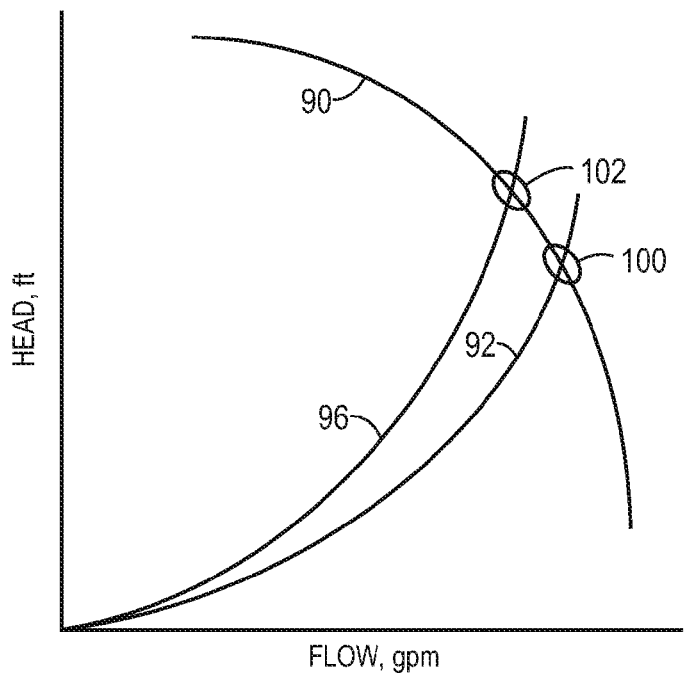
FIG. 4 is an illustration of a plot of a system curve versus a pump curve for the determination of operational ranges of a polymerization system, in accordance with an aspect of the present disclosure.

As shown in FIG. 4, during the operation of a reactor system such as system 10, process measurements may be noisy, and the operating space may be a region 100 instead of a point. That is, the region 100 may represent various locations of the operating point 94. The various locations may be due, at least in part, to error in equipment, measurement noise, and so forth. During stable operation, such as when the system 10 is operating under non-fouling conditions, the region 100 may be relatively stable, and the operating region 100 may move along a path constrained by the pump curve 90. That is, the path of the operating point 94 may deviate from the pump curve 90 and/or from its present position to an acceptable degree and within a given distance in a given amount of time under stable operating conditions. In some embodiments, the reactor operating variables may change such that the location of the operating region 100 changes in accord. For example, the operating region 100 may move to a new operating region 102 over a given period of time. The movement may be incremental, such that the movement over time is gradual or rapid. Indeed, the variables and changes being monitored may be along a path constrained by the shape of the pump curve 90, wherein rapid movement of the operating region 100 indicates rapid change within the reactor 12. Thus, in some embodiments, the movement of the operating region 100 along the path defined by the shape of the pump curve 90 may be utilized to indicate incipient fouling conditions. For example, if the operating region 100 deviates greatly from the path substantially constrained by the pump curve 90, there may be an indication of an incipient fouling condition.

In some embodiments, the criteria for detecting incipient fouling may include determining the distance traveled by the operating region along the pump curve 90 from the original operating region 100 during stable operation. This distance may be approximated by the vector length between two successive points (such as operating point 94 and operating point 98 in FIG. 3) within the system state plot. For example, if the pump head and pump flow at time n are $H_n$ and $Q_n$, respectively, and the pump head and pump flow at time n+1 are $H_{n+1}$ and $Q_{n+1}$, respectively, then the distance traveled in the given time interval between time n and time n+1 may be represented by the following equation:

$$d=\sqrt{(H_{n+1}-H_n)^2+(Q_{n+1}-Q_n)^2} \qquad (1)$$

where the calculated distance may be taken as positive if the flow increases and negative if the flow decreases. In this manner, the time averaged distance the operating region 100 may move during stable operation may approach zero. It should be noted that for a short time span in between the collection of successive data points, such as when the time between n and n+1 is relatively small, the distance d may approach about zero. When the system state changes quickly, such as during incipient fouling, the operating region 100 will move to a new location within a relatively short amount of time, resulting in a time averaged distance that may deviate from about zero. The extent of distance and time and their relation to one another may vary from one polymerization process to another. For example, what defines a "large" distance over a "short" amount of time may be determined on a process by process basis, as defined by a predictive model.

Figure 5:
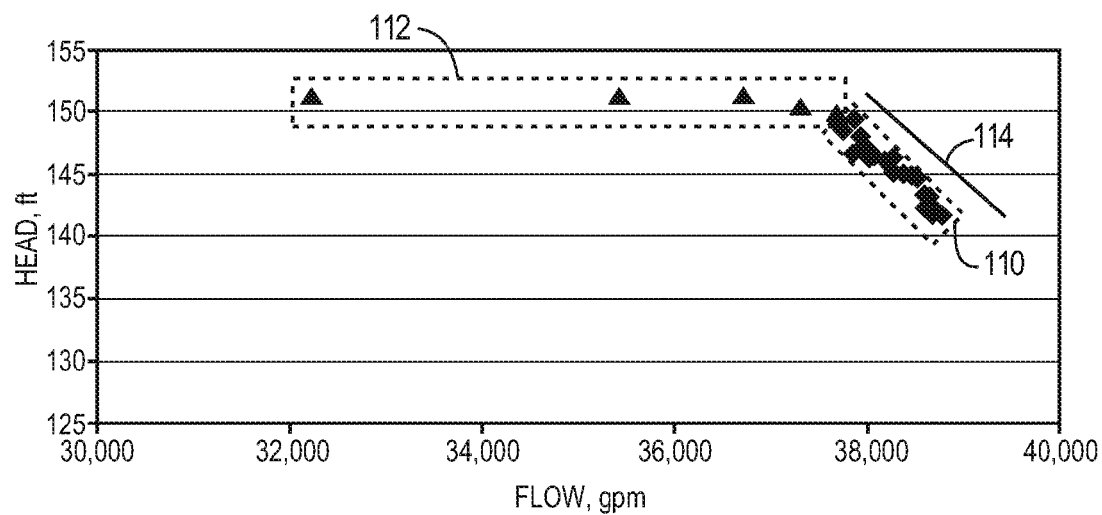
FIG. 5 is a plot of collected system data points with respect to a pump curve for the determination of incipient fouling conditions, in accordance with an aspect of the present disclosure.

Referring now to FIG. 5, a graph of collected data is shown illustrating a collection of measured reactor system data points (such as the operating point 94) compared to a portion of a calculated pump curve supplied by a pump manufacturer (such as the pump curve 90). In the illustrated embodiment, the diamond-shaped data points, enclosed by a dashed box 110, indicate stable operation. That is, the time averaged distance between each data point within the dashed box 110 may be about zero. Conversely, the triangle-shaped data points, enclosed within a dashed box 112, may indicate incipient fouling conditions. The time averaged distance between the data points within the box 112 may deviate from about zero, which may be indicative of incipient fouling. The smooth curve 114 may be a calculated pump curve. In this embodiment, the measured values within the box 110 fall to the left of the pump curve, which may be due to instrument calibration errors. Nevertheless, these errors may be of little consequence, as the criteria developed according to the present technique use the relative movement of the operating region 100 based on the measured values.

Figure 6:
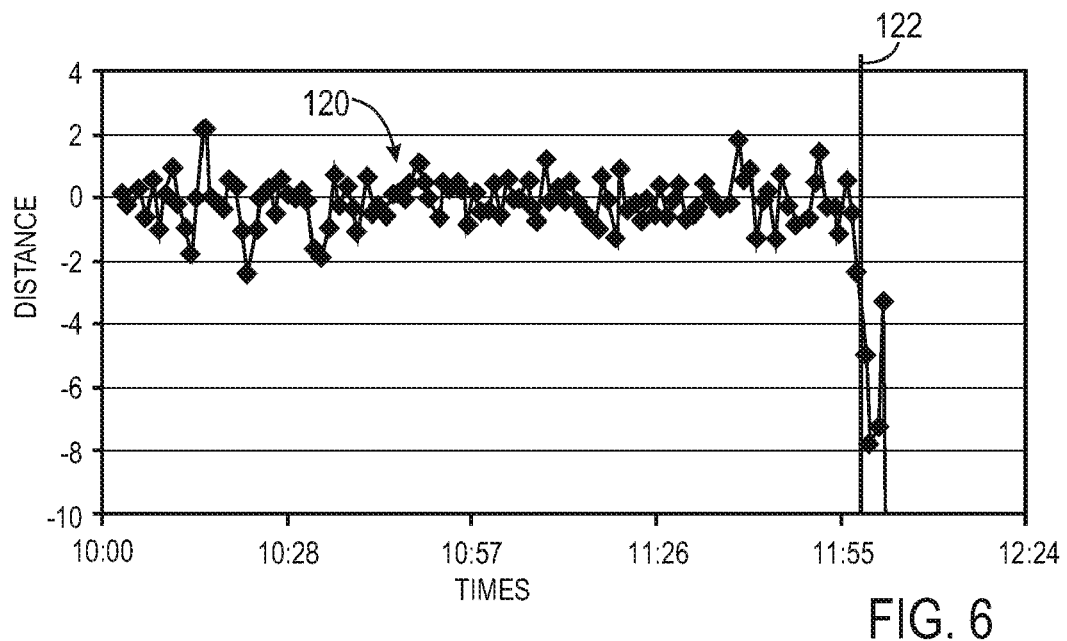
FIG. 6 is a plot of calculated distances traveled by operating points along a path substantially constrained by a system curve, in accordance with an aspect of the present disclosure.

FIG. 6 illustrates a plot of the calculated distance, using equation (1), between the data points depicted in FIG. 5. The data points were collected successively at regular time intervals. In some embodiments, each successive data point may be collected after a given period of time, which may be referred to as a time step. In certain of these embodiments, the time step may be indicative of a sampling rate (or sampling frequency) of data acquired from the loop reactor system 10. Some embodiments of the present technique may utilize different time steps. That is, different sampling rates may be determined on a process by process basis, such that the monitoring of the system state provides ample time to respond to incipient fouling conditions while substantially avoiding false indicators, which may lead to premature corrective action. For example, in a loop reactor, such as the loop reactor 12, the range of time steps may be between about 1 second and about 5 minutes. In certain of these embodiments, the sampling frequency may be determined by the amount of time for a given point within the slurry circulating within the loop reactor 12 to make one lap around the loop reactor 12. In some embodiments, the time for a point within the circulating slurry to lap around the loop reactor 12 may be about 30 seconds. Thus, inasmuch as the sampling interval is determined to be a multiple of the number of laps around the loop reactor 12 by the circulating slurry, the sampling interval may be between one and six laps, inclusive. In other embodiments, the sampling interval may be a fraction of one lap. For example, the sampling interval may be ⅕ lap, or ⅓ lap, or ½ lap, and so on.

The plot of calculated distance, denoted using reference numeral 120, depicts data points that fall within a small range around about zero (the distance traveled between successive time steps is about zero) and data points that move a substantial distance between approximately 2 and −2. Indeed, in the depicted embodiment, the distance plot 120 moves from distances of about zero, which generally correspond to the diamond-shaped data points enclosed by box 110 in FIG. 5, to distances in negative ranges beginning at a time point 122, which generally correspond to the triangle-shaped data points enclosed by box 112 in FIG. 5. In embodiments according to the present technique, the negative distances may be indicative of an incipient foul. That is, a negative distance is taken as a decrease in flow, which may indicate abnormal operating conditions. The decrease in flow, as mentioned, may be due to a number of factors including increased polymer size and concentration (increased solids weight percent measured at the reactor 12).

As illustrated, the distance plot 120 may result in measurements of the system state, and more specifically, the pump power, that are noisy. That is, there may be slight fluctuations in the measured values of the system state which could lead to premature corrective action. Thus, in another embodiment, the system state may be monitored by calculating a running average of distances traveled by a number of system state data points (or operating ranges). For example, average distances may be calculated for small subsets of data points (system state data points or operating ranges), with the subsets being defined by a given timeframe. Thus, an average distance may be calculated, for example, for all distances occurring within 30 seconds. This would be one data point of a running average plot, such as distance average plot 124 depicted in FIG. 7. As noted above, monitoring the system state in such a way may also afford the ability to monitor the relative movement of the operating range 100.

Figure 7:
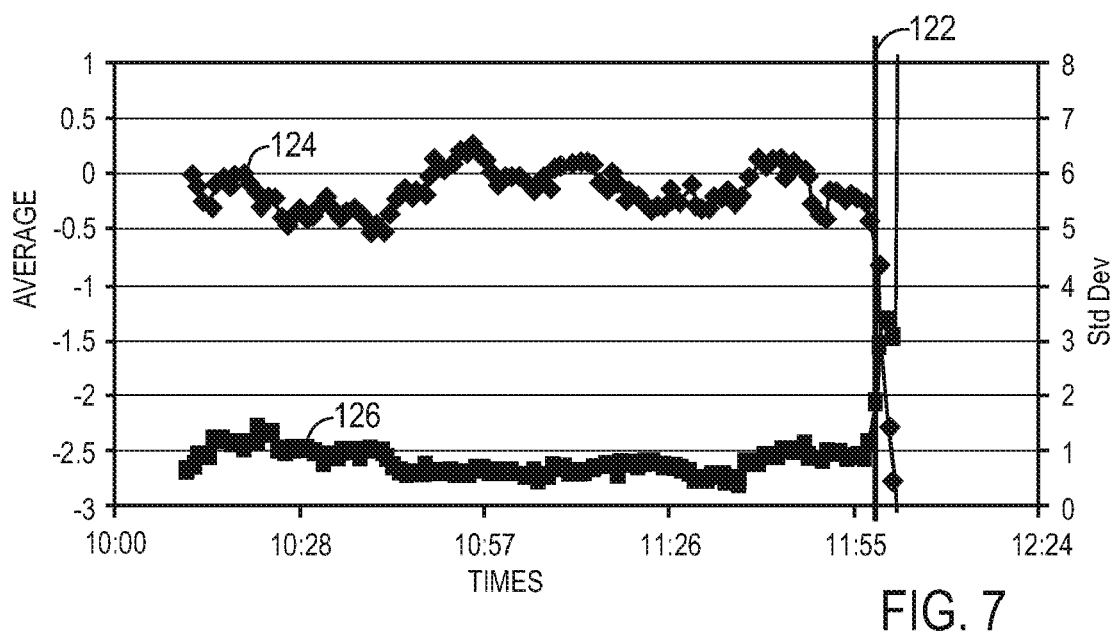
FIG. 7 is a combined plot of average distance traveled over time by operating points collected successively along a path substantially constrained by a pump curve and their standard deviations, in accordance with an aspect of the present disclosure.

Monitoring the standard deviation of the distances traveled by the operating range 100 may also be indicative of an incipient foul, and may provide a buffer against instantaneous irregular data. With this in mind, the plot 124 of a running average of successive system state data points (as shown in FIG. 6) combined with a plot 126 of their standard deviations is shown in FIG. 7. In the illustrated embodiment, the plot of average distance 124 moves from an average distance of about zero and falls to negative values relatively quickly. At about the same time, the plot of standard deviation 126 exhibits a concomitant increase in value, which may be indicative of a relatively fast increase in the distance traveled between successive data points. According to the present embodiments, the greater distances traveled in a shorter amount of time may be an indication of an incipient reactor foul. The relatively rapid movement may indicate that the circulation velocity may be decreasing while the pressure within the reactor 12 may be increasing at a faster rate than the rates during normal operation. Such rapid movement may be due to, for example, an increase in fines, a sharp increase in average solids weight percent, and the like.

The data of plots 120, 124 and 126 may generally represent a reactor that is moving away from normal operation (at the left of the plots) and moving towards an incipient foul (at the right of the plots). Additionally, such readily ascertained and statistically relevant criteria may be used to construct run charts using similar plots, such that a predictive model may be constructed to aid in the prevention of reactor fouls. For example, a series of runs may be analyzed by plotting their respective system and pump curves, and the distances traveled by their respective operating ranges may be measured. The changes during the series of runs that occur prior to a foul may be analyzed for their relative indication of an incipient foul. By way of example, if the plot of the standard deviation of a number of distances traveled by a number of operating ranges during a series of runs is stable at about −2.5, and an increase to about −2 within a short amount of time (e.g., one minute) occurs before a foul in 70% of those runs, then a determination may be made that an increase in the value of the standard deviation from −2.5 to −2 within one minute may give rise to a 70% chance of a reactor foul. Indeed, a large change in any of the above measurements (of the distance traveled by the operating point or range along the path defined by the pump curve) may be an indication of an incipient reactor foul (i.e., a predictive indicator). A large change may be defined for each measurement by the constructed predictive model, and may be represented as percentage change over time. That is, the large change in the distance traveled, the average distance traveled, and/or the standard deviation of distances traveled by the operating point or range may be defined by the predictive model as change of at least about 20%, at least about 50%, at least about 100%, or at least about 200% or greater over a period of about 30 seconds, about 1 minute, about 2 minutes, or about 5 minutes or more. Such warning may afford the human operator or the controller 20 sufficient time to perform a corrective action in response to the predictive indicator defined and/or recognized by the predictive model.

According to present embodiments, a number of factors must be taken into account in constructing the predictive model, such that the construction of the model is accurate. For example, runs may be divided into categories based on a number of factors including the type of catalyst used to carry out the polymerization, the reactor geometry, the monomer to be polymerized, the diluents used to suspend the polymerization components, the polyolefin product to be produced, and the like. In other words, various predictive models may be necessary for various types of polymerization reactions. Accordingly, it may be necessary to determine the optimal sampling frequency for each run, as described above. Further, different run charts may be constructed such that many different variables may be analyzed, and, therefore, monitored for incipient fouls. For example, run charts may be constructed for solids weight percent monitoring, temperature monitoring, catalyst activity monitoring, and so forth. In some embodiments, the data may also indicate the type and extent of corrective action that may be sufficient for avoiding a foul.

With the foregoing in mind, the current technique provides, as depicted in FIG. 8, a method 130 of monitoring the system state of a polymerization reaction, such as a polymerization reaction within the reactor system 10. It should be noted that some or all of the process steps of method 130 may be automatically performed by the controller 20 in communication and/or in conjunction with the workstation 64. Further, various processes within method 130 may, alternatively or additionally, be by performed by the human operator. The method generally includes plotting a pump curve (block 132), monitoring system variables (block 134), determining the reactor system state (block 136), and determining and monitoring the present operating range (block 138). In block 132, the plot of the pump curve, as noted above with regard to FIG. 4, may be calculated from collected data or may be provided by a pump manufacturer. Once a polymerization reaction has begun, a number of variables may be monitored (block 134) to determine the system state (block 136). The variables may be monitored by the code 32 within the controller 20, and may include one or more of the following variables: the density of the fluid within the reactor, and/or the pressure within the reactor, and/or the power consumption by the circulating pump, and/or the amount of polymerization components within the reactor (e.g., the weight percent of solids, monomer, comonomer, and so forth), and/or the flow of fluid through the reactor, to name a few. The determination of the system state according to block 136 may be performed by one or more logic and/or statistical analysis functions stored on the code 32, and may include plotting the pressure and the flow (either measured directly or indirectly) in the reactor 12 to generate the system curve 92 described above with respect to FIGS. 2-4, which may be plotted with respect to the plot of the pump curve 90. As such, the intersection of the two may be representative of the current operating point (or range), such as the operating range 100 depicted in FIG. 4. The controller 20 or the human operator may monitor the operating point or range (block 138), such that information about the polymerization system (such as system 10) may be obtained. Based on the result of block 138, corrective action may be taken when appropriate (block 140). For example, the controller 20 and/or the human operator may adjust any one or a combination of reactor variables and operational parameters.

Monitoring the operating point 94 or range 100 may include monitoring the distance traveled by the operating range 100 along a path constrained by the pump curve 90, or may include monitoring the average distance 124 and/or standard deviation 126 of the same over time. Further, block 138 may include monitoring the operating point 94 or range 100 with respect to a predictive model, such that any indication (e.g., the indications discussed above with respect to FIG. 7) of a predicted reactor foul may be recognized. According to some embodiments of the present technique, monitoring the operating point 94 or range 100 in such a manner may provide the human operator and/or controller 20 with sufficient warning of an incipient foul. As such, the human operator and/or controller 20 may take one or more corrective actions (block 140) far enough in advance to prevent significant problems within the polymerization reactor. For example, the controller 20 may activate valve control circuitry to increase the reactor temperature to dislodge built-up polymer from the reactor walls, and/or lower the reactor temperature to decrease catalyst activity levels, and/or increase the weight percent solids withdrawn from the reactor 12, and/or increase diluent, monomer and/or comonomer flow into the reactor 12, to name a few. Further, the human operator may manually actuate valves controlling the same.

In accordance with another aspect of the present technique, it may be desirable to measure or monitor the individual system parameters (variables of the polymerization process) that may be represented, at least partially, by the system curve 92. As noted above, the system curve 92 may be determined by system geometry (e.g., number of legs in the reactor 12, diameter of the reactor 12, the dimensions of a curvature in the reactor 12, etc.) and slurry physical properties (e.g., solids concentration, particulate size). Typically, the system geometry does not vary during a polymerization process and thus, may be considered to be a constant during operation. Conversely, in certain aspects, the physical properties of the slurry may vary greatly, and, therefore, may be monitored by measuring the instantaneous state of a number of system parameters indicative of these physical properties. The measured parameters representative of the physical properties may include one or more of the following: the solids weight percent and its rate of change, and/or the weight percent of monomer or monomers and their rate of change, and/or the weight percent of comonomer or comonomers and their rate of change, and/or the reaction temperature, instantaneous polymer production, and/or the power consumption of the circulation pump, to name a few. It should be noted that the weight percent of each component (e.g., solids weight percent) may be defined as the weight of the particular component (e.g., polymer) as a percentage of the weight of the total reactor contents (e.g., polymer, diluent, monomer, comonomer, and so forth).

Slurry circulation (and thus stable reactor operation) may be aided by controlling the concentration and extent of the growing polymer granules in the reactor diluent. For example, the concentration and size of the polymer granules may directly affect their ability to be suspended (and thus circulated) in the reactor 12. In some situations, a reactor foul may occur if the solids concentration reaches a level above the operational capacity of one or more reactor components. In certain embodiments, therefore, it may be desirable to monitor the parameters that represent and/or affect the amount of solids within the reactor.

In accordance with the present technique, one or more polymerization process parameters may be adjusted in response to measured data representative of the current state of the polymerization system 10. The representative data may include information about the dynamics of the system 10, individual process variables within the reactor 12 (e.g., the rate of change of any one or a combination of solids weight percent, catalyst feed, monomer feed, comonomer feed, molecular weight control agent feed, reactor temperature, pump power consumption, etc.), or summations of data that incorporate one or more process variables (e.g., a system curve or a dynamic balance term). The nature and extent of adjustment to the process parameters may depend on a number of control scheme specifications, including control schemes implemented to perform proactive measures. For example, in some embodiments of proactive control schemes, individual process variables may be monitored such that each variable is maintained within a certain predetermined range. In another embodiment, a proactive control scheme may include monitoring the rate of change of individual or a combination of process variables, such that a predictive model is used to determine the onset and extent of corrective action when the rate of change is indicative of an incipient foul. That is, when various measured parameters meet or exceed threshold or set values that have been defined by a predictive model to be indicative of an incipient foul, proactive measures may be implemented. Such parameters may include changes in solids weight percent, monomer/comonomer weight percent, and so on, as discussed herein. In yet another embodiment, a proactive control scheme may include monitoring the state of the polymerization system 10 as a whole (e.g., a system curve), and may further include adjusting polymerization process parameters such that any deviations from a normal operating range of the system 10 is corrected. Indeed, some embodiments may include implementing any one or a combination of the features of the control schemes.

In one aspect, the solids weight percent may be controlled by the diluent flush rate, which may serve to not only reduce or increase the solids weight percent, but may also affect other parameters such as the monomer and comonomer weight percent, the catalyst weight percent, and even the feed rates of other polymerization components. In accordance with an aspect of the present technique, in view of the propensity of the solids weight percent to climb rapidly in certain reactor implementations, it may be desirable to mitigate the rapid increase in the rate of polymer production, even in instances where the present value of the solids weight percent is within an acceptable range. Such mitigation may be considered a "feed forward" implementation, where corrective action is taken to control rates of change, rather than instantaneous measured values. In embodiments where the rates of change are substantial, the feed forward implementation may adjust one or a combination of parameters (e.g., diluent feed, monomer feed, catalyst feed) such that reactor conditions return to a predetermined operating range. Indeed, the feed forward implementation may include a variety of monitoring, control, and corrective action processes, such that a MCS (manufacturing control sheet) and/or a predictive model and/or dynamic balances and the like (which are described in further detail below) may be appropriate for efficient operation of the reactor system 10.

For example, in embodiments where the solids weight percent is within a suitable range yet is changing rapidly, the human operator and/or the controller 20 may actively adjust the feed of diluent into the reactor 12 to slow or reverse the rate of change of the solids weight percent. In other embodiments, such as when the solids weight percent is out of the suitable range, the human operator and/or controller 20 may still make the adjustment, such that the rate of change of the solids weight percent is stabilized/slowed.

Accordingly, FIG. 9 is a process flow diagram of an embodiment of a method 150 for monitoring and controlling the solids weight percent (SW %) in a reactor, such as reactor 10. Method 150 may include determining a suitable solids weight percent target and the acceptable levels of rate change of the solids weight percent (block 152), which may occur prior to and/or during a polymerization reaction. Such determination of values may be performed by an operator or may be defined by a predictive model constructed from past polymerization runs. The solids weight percent may then be monitored (block 154). A determination is made as to whether a corrective action is suitable (block 156). In embodiments where the solids weight percent is close to its desired setpoint, the method 150 may cycle back to block 154. However, in embodiments where the solids weight percent or solids weight percent rate of change is outside of an acceptable range, a suitable corrective action is then identified (block 158). The corrective action is then performed (block 160), such that the solids weight percent is returned to its suitable operating range and/or the rate of change of the solids weight percent is within acceptable bounds. Therefore, it should be noted that upon startup of a polymerization reactor, such as reactor 12, the polymerization conditions may be selected to meet the suitable solids weight percent, or the suitable solids weight percent may be determined after initial measurements are performed shortly after reactor startup. For example, the controller 20 and/or human operator may adjust the feed rates of different polymerization components and/or adjust the take-off rate of the slurry produced by the polymerization reaction to adjust the solids weight percent.

Block 152 may depend on a variety of factors, including the geometry of the reactor 12, the method used for polymerization, the method used for polymer collection, and the type of polyolefin that is produced, to name a few. Block 152 may also include a determination of the acceptable levels of rate change of the solids weight percent. For example, the reactor 12 of FIG. 1 employs the continuous take-off feature 62 for the withdrawal of slurry from the reactor 12, rather than a settling leg. By employing the continuous take-off feature 62, the optimal range of solids within the reactor 12 may be higher than if the settling leg were utilized. In another example, a polyolefin with a high density may be produced when only one monomer is used. Conversely, a polyolefin with a lower density may be produced when a comonomer is polymerized along with the monomer. In such a case, the suitable range of solids weight percent for the higher-density polyolefin may be higher than that of the lower-density polyolefin.

After a suitable target has been determined (block 152), the solids weight percent and the solids weight percent rate of change is monitored (block 154). In one embodiment, block 154 includes measuring the percent of solids collected from the total amount of slurry directed to the flashline apparatus 18. Accordingly, the solids weight percent may be plotted as a function of time to measure the rate of change of the solids weight percent. The rate of change of the solids weight percent may be low, acceptable, high, or approximately zero, where the terms low and high are relative to a predetermined appropriate range (such as defined by a predictive model). According to the present embodiments, in situations where the solids weight percent accumulating in the reactor 12 changes by a large magnitude in a short amount of time, despite whether the solids weight percentage is within the suitable range or not, an incipient foul may be indicated.

In other embodiments, the solids weight percent may be indirectly measured, such as by measuring the power consumption by the pump 48. For example, if the solids concentration within the reactor 12 is low, the pump 48 that provides the motive force for circulation within the reactor 12 may not need as much power to maintain a predetermined circulation velocity. As an example, the pump power may range from about 750 to about 900 kW to maintain a certain slurry velocity operating range, with the pump power being about 875 kW during normal operation, and about 775 kW when the solids weight percent decreases. Therefore, in one embodiment, the relative amount of solids within the reactor 12 may be inferred by monitoring the power consumption of the pump 48. In a similar manner to that noted above, the power consumption of the pump 48 may be plotted as a function of time as another indirect method of monitoring the rate of change of the solids weight percent.

Based on the measurements obtained from block 154, a determination is made as to whether a corrective action may be appropriate (block 156). In embodiments where the solids weight percent is not changing or changing by an acceptable magnitude (and where the solids weight percent is close to its predetermined setpoint), the method 150 may cycle back to block 154. However, in embodiments where the solids weight percent is changing at a rate outside of an acceptable range of rates or if the solids weight percent falls outside of an acceptable range of percentages the method 150 may progress to the identification of a suitable corrective action (block 158).

The identification according to block 158 may include ascertaining the nature and extent of the solids weight percent rate change or the instant value of the solids weight percent. For example, in embodiments where the solids weight percent is increasing, the controller 20 may identify that a corrective action that will slow down or reverse the increasing trend is appropriate. Indeed, diluent feed may be increased to lower the average solids content in the slurry circulating within the reactor 12. In embodiments where the rate of increase of the solids weight percent is large (i.e., a highly positive slope in a plot of solids weight percent vs. time), the diluent feed to the reactor 12 may be increased quickly, and/or to a large extent. In embodiments where the rate of increase is slight (i.e., a slightly positive slope), the diluent feed to the reactor 12 may be slightly increased and/or to a small extent.

Conversely, in embodiments where the rate is decreasing, the diluent feed may be decreased in a manner consistent with the steps noted above.

Therefore, in embodiments where the rate of change is great (a large absolute value), the diluent feed may be increased or decreased not based upon the instantaneous value of the solids weight percent, but based upon the rate of change of the solids weight percent. Thus, as mentioned, there may be embodiments where the rate of diluent feed is adjusted, regardless of whether the solids weight percent is within an optimal range.

Thus, the corrective action (block 160) may start, stop, increase, or decrease diluent feed levels, monomer feed levels, catalyst feed levels, and so forth. In one embodiment, the diluent feed is adjusted. In embodiments where lowering or increasing the amount of diluent is not appropriate, such as when lowering the diluent levels in the reactor 12 would result in a loss of pressure within the reactor 12 or increasing the diluent levels may exceed the capacity of the reactor 12, the human operator and/or controller 20 may increase or decrease feed levels of the monomer, catalyst, or both to adjust the solids weight percent. Further, it should be noted that in some embodiments, the instantaneous values of the rates might fluctuate. In such embodiments, alternative values representing the solids weight percent may be used. These include trailing averages and/or standard deviation changes, such as those noted above with respect to FIGS. 6 and 7. Additionally, the appropriate corrective action taken in block 160 may be a pre-determined response, as determined by construction of a predictive model and represented on a manufacturing control sheet (MCS).

In embodiments utilizing a metallocene/solid super acid catalyst system, unlike loop processes employing catalyst systems such as a chromium oxide on solid support, various parameters may not impact the solids weight percent to an equal degree. In one situation, the feed rate of monomer or comonomer may not account for a large monomer inventory, and the solids weight percent may still climb even if the monomer feed rate is temporarily lowered. Indeed, the solids weight percent, when a metallocene/SSA catalyst system is employed, may climb very sharply (e.g., within one to three minutes) when the reactor 12 has a high monomer inventory, resulting in a reactor foul.

As noted above, a number of factors may be responsible for the amount of solids present within the reactor 12. Accordingly, these factors may be monitored in addition to or in lieu of the solids weight percent for possible fouling situations. For example, high monomer feed levels (e.g., high ethylene feed) coupled with a highly active catalyst system (e.g., metallocene/SSA) may lead, rather quickly, to a relatively high solids concentration. In situations where this process occurs at a rate that exceeds the capabilities of the system 10 (such as the ability of the pump 48 to circulate the slurry through the reactor 12), a reactor foul may occur. For example, an increased rate of reaction may lead to a nearly instantaneous increase in the solids weight percent present within the reactor 12. The concentration of the solids may then be at a level such that the amount of diluent present within the reactor 12 is not sufficient to suspend the polymer particles, which may lead to a decrease in slurry circulation and eventually, a reactor foul.

Thus, in one embodiment according to the present disclosure, the human operator and/or controller 20 may attempt to maintain, directly and/or indirectly, the solids weight percent in a range of, for example, between 35 and 40 weight percent. Indeed, finer control may be possible, and the range may be tapered to between 37.2 and 37.8 percent. To achieve such control, the predictive model-based controller 20 may continuously control parameters that at least partially affect the solids weight percent present (and the rate of change of the solids weight percent) within the reactor 12. For example, it is now recognized that the feed rate of the monomer (e.g., ethylene), the comonomer (e.g., hexene), the monomer and comonomer inventory (amount of monomer and/or comonomer present within the reactor as inferred from the relative weight percent of either collected from the flashline apparatus 18), the reactor temperature, the catalyst activity and feed rate, molecular weight control agent feed rate, and the feed rate of the diluent (e.g., isobutane) all may affect the solids weight percent.

In some embodiments, an operator (which may be a human operator or a computerized controller) may monitor individual system variables in an effort to control the dynamics of the system 10. In one embodiment, the operator may monitor the monomer weight percent and make adjustments to the system 10 such that the monomer weight percent is maintained within a certain operating range. Controlling the monomer weight percent within a range rather than to a setpoint may provide the advantage of more stable operation of the reactor 12 (i.e., constant perturbations of the system 10 are avoided).

Figure 10:
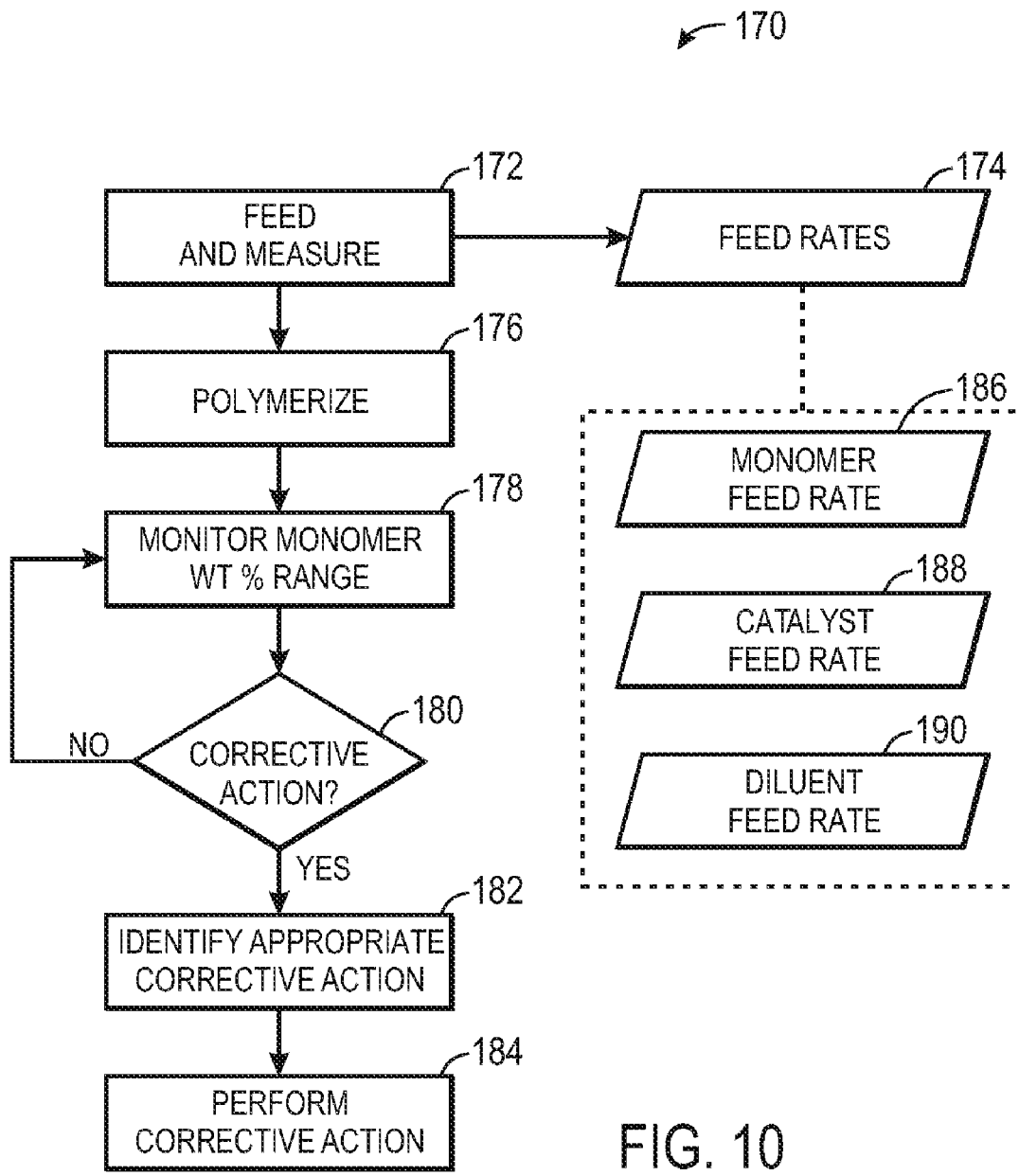
FIG. 10 is a process flow diagram of a method for controlling monomer weight percent, in accordance with an aspect of the present disclosure.

One embodiment may involve the monitoring and control of monomer (e.g., ethylene) levels within the reactor 12 which, as mentioned, may directly affect the solids weight percent within the reactor 12. Accordingly, as shown in FIG. 10, a method 170 is illustrated which may include a number of features for controlling the amount of monomer and in some embodiments, the comonomer, present within the reactor 12. The method 170 may begin by measuring amounts of feed entering in to the reactor 12 (block 172) to generate feed rates 174. The fed and measured components are then polymerized within the reactor 12 (block 176). The monomer wt % range and in some embodiments, the amount of comonomer present within the reactor is then monitored (block 178). Based upon the measurements performed during block 178, a determination is made as to whether a corrective action is appropriate (block 180). In embodiments where no corrective action is appropriate (e.g., the monomer weight percent is within an acceptable range), the method 170 may cycle back to block 178. However, in embodiments where the monomer weight percent or monomer weight percent rate of change is outside of an acceptable range, an appropriate corrective action is then identified (block 182). The corrective action is then performed (block 184).

It should be noted that "monomer", as used in the discussion of method 170, might also apply to a comonomer (e.g., 1-hexene) in addition to or in lieu of the base monomer (e.g., ethylene). Thus, the method 170 may also provide control over the same. As noted above, block 172 may provide the human operator and/or controller 20 with feed rates 174 that may be useful in a future determination of corrective action as provided by a predictive model or MCS, and may include a monomer feed rate 186, a catalyst feed rate 188 and/or a diluent feed rate 190, among others (e.g., in some embodiments, a hydrogen feed rate).

The reactor 12 may then carry out the polymerization process under a predetermined set of conditions, as represented by block 176. It should be noted that the predetermined set of conditions may be based upon the geometry of the reactor 12, the desired polymer product, and so forth. As the slurry, which includes the components fed into the reactor 12 in addition to the growing polymer particles, flows through the reactor, a portion is withdrawn. For example, a portion of the slurry may be withdrawn at the continuous take-off 62.

In one embodiment, block 178 is performed by measuring the total amount of unpolymerized monomer within the slurry that is directed to the flashline apparatus 18. In some embodiments (e.g., a continuous process) the amount of monomer that is unpolymerized (the weight percent monomer at the flashline apparatus 18) may be plotted as a function of time. Accordingly, the human operator and/or the controller 20 may be able to ascertain whether the monomer weight percent is changing and at what rate. In block 180, the human operator and/or the controller 20 may determine, based on the plot of monomer weight percent versus time, whether corrective action is needed. In embodiments according to the present technique, corrective action may be needed when the monomer weight percent is changing greatly over time, regardless of the instantaneous value of the monomer weight percent. In certain of these embodiments, the human operator and/or controller 20 may utilize a predictive model and/or a MCS to determine if corrective action is appropriate.

In embodiments where the monomer weight percentage is determined to be experiencing little to no change or is within an acceptable range, no action may be taken and the polymerization process may continue in a steady state, in which case the method 170 cycles back to monitoring the monomer weight percent according to step 178. Should the predictive model or the MCS call for corrective action, (e.g., if the amount of monomer is changing outside of an acceptable range), the human operator and/or controller 20 may identify the appropriate corrective action (block 182).

It should be noted that the corrective action represented by block 184 may include a variety of adjustments. For example, in some embodiments, the monomer feed rate 186 may be adjusted. In certain of these embodiments, such an adjustment may be a result of a prediction by the predictive model. For example, the measured feed rates 186, 188 and/or 190 and solids weight percent may provide indicia that the catalyst activity is within a normal range but that the catalyst feed rate 188 is unstable (e.g., the amount of catalyst entering into the reactor 12 is not consistent), which may lead to a reactor foul. Other embodiments may indicate that the catalyst level of activity is higher than expected, and that the monomer feed rate 186, catalyst feed rate 188, and/or diluent feed rate 190 may need to be adjusted accordingly to prevent a runaway polymerization. As such, any of the feed rates 174 may be adjusted according to its measured instantaneous rate, which is determined in block 172. Thus, block 172 may be performed substantially concurrently with any or all of the steps within the method 170. As an example, in one embodiment of block 178, the monomer weight percent may be decreasing (have a negative rate trend). Accordingly, in block 184, the predictive model, MCS, and the like may provide an increase in the monomer feed rate 186. Conversely, in some embodiments according to block 178, the monomer weight percentage may be increasing. In such embodiments, the monomer feed rate 186 may be decreased in block 184. It should be noted that the above example of increasing and/or decreasing the monomer feed rate 186 is merely to facilitate discussion, and is not intended to cover every possibility of what may constitute an identified situation and/or an appropriate corrective action. For example, in other embodiments, block 184 may encompass an adjustment to the catalyst feed rate 188 and/or the diluent feed rate 190 in addition to or in lieu of an adjustment to the monomer feed rate 186.

In another aspect of the present technique, block 182 may also include identification of the extent of the corrective action that is appropriate, such as an adjustment to the feed rates 174. For example, an increase in any of the feed rates 174 in block 184 may be a large increase if the rate of change of the monomer weight percentage is highly negative (a large negative slope), as determined in block 178. In other embodiments, the rate of change of the monomer weight percentage may be only slightly negative. In these embodiments, any one or a combination of the feed rates 174 may be increased slightly in block 184. Similar operations with regard to the extent of feed decrease may be performed with respect to an increasing monomer weight percentage.

As mentioned above, in some embodiments, during the operation of the loop reactor system 10, it is possible that the catalyst present within the loop reactor 10 may lose a certain amount of its activity (ability to catalyze the polymerization reaction). Therefore, although relatively high levels of monomer may be present within the reactor 12 (high monomer inventory), the solids concentration may be relatively low compared to what may be expected if the activity of the catalyst were maintained. For example, during normal operation, the reactor 12 may have close to 40% weight percent solids, and the monomer weight percent may be about 5 wt %. However, when the catalyst system loses activity, the weight percent of solids may decrease to about 32%, and the weight percent monomer may rise to about 7.5%. Indeed, if catalyst activity is low and the monomer feed is maintained at a constant rate, the levels of monomer collected from the flashline apparatus 18 may be relatively high, as a smaller amount of the monomer feed has been polymerized.

In some embodiments (e.g., during continuous operation of the reactor system 10), it may be desirable to continuously add catalyst to the reactor 12 to maintain the amount of solids present within the reactor 12 (and thus collected at the flashline apparatus 18). In such embodiments, it is often desirable for the catalyst activity to be maintained at a substantially continuous level, such that the relation between the amount of continuous feed of monomer into the reactor 12, the amount of resultant solids within the reactor 12 and the amount of resultant solids that should be continuously withdrawn is known. However, although a system, such as system 10, may be configured to continuously add a catalyst mixture to the reactor 12, the instantaneous solids weight percent as a result of the instantaneous activity of the catalyst may not be readily ascertained or predicted. Thus, it may be difficult to assess and/or predict important process variables such as polymer properties and incipient reactor fouls, to name a few. Therefore, while methods 150 and 170 may account for the solids weight percent and the monomer weight percent collected from the flashline apparatus 18, respectively, it may also be desirable to determine the dynamics of the polymerization reaction occurring within the reactor 12. For example, in one embodiment the dynamics of the system may represent, at least in part, the instantaneous level of productivity within the reactor 12.

According to one embodiment of the present disclosure, the instantaneous activity of the catalyst may be substantially ascertained by monitoring an energy balance of the system 10. That is, in some embodiments the energy balance may be representative of the instantaneous (e.g., substantially real-time, such as within 10 seconds, 30 seconds, or 1 to 2 minutes) production rate of the reactor 12. In one embodiment, the energy balance may be calculated by monitoring the response of the cooling system 14 to compensate for the heat generated by the polymerization reaction within the reactor 12. For example, if during the course of the polymerization process, the reactor 12 experiences an increase in heat production, the cooling system 14 may increase the flow of coolant through the cooling jackets 22 to compensate for this increase. The increased influx of coolant may be proportionate to the increase in temperature, and the increase in temperature may be proportionate to an increase in polymer production (polymerization facilitated by the catalyst). Thus, using these relationships, it may be possible to calculate the real-time production rate of polymer, which is representative of the instantaneous level of productivity. For example, if the level of catalyst activity is very high, and the amount of monomer present within the loop reactor is relatively high, a reactor foul may occur as the production rate of polymer experiences a nearly instantaneous surge. In some situations, the polymerization reactor system 10 may not be able to compensate for the surge, either by lowering the reactor temperature or increasing the rate of product withdrawal.

Despite the relation between reaction temperature and polymer production, an increase in temperature may not necessarily correlate with an impending reactor foul. For this reason, another term may be taken into consideration that accounts for the material provided to the polymerization reactor 12. Such a term may be considered a mass balance term, as it may encompass the total and relative amounts of steady-state raw material feeds into the reactor 12 (as opposed to a final production reconciliation). Accordingly, a difference between the energy balance term (amount of production) and the mass balance term (amount of feed) may serve to represent the dynamics of the system 10, and may be considered a dynamic balance term. In situations where the dynamic balance term is about zero, the system may be considered to be in a stable (non-fouling) operational state. Conversely, if the two terms are not substantially equal, there may be a dynamic imbalance in the reactor system 10, as represented by the relative size of the absolute value of the dynamic balance term. In embodiments where the energy balance term is much greater than the mass balance term, the dynamic balance term may have a positive value, indicating a surge in production rate. In some embodiments, such a surge may be an indication of an impending reactor foul. Conversely, if the energy balance term is much lower than the mass balance term, the dynamic balance term may be negative, and the system may be experiencing low catalyst activity, which is an indication of low efficiency. In embodiments where the dynamic balance term deviates greatly from zero, corrective action may be appropriate. Further, such situations may be mitigated by incorporating proactive control features into the polymerization system 10, such that the dynamic balance term may be maintained at about zero.

In an example of a situation where the dynamic balance term deviates from about zero, in one embodiment, 30 klb/hr of raw materials (mass balance) may be fed to the reactor 12, and, in that instant, 32 klb/hr of polymer may be produced (energy balance) within the reactor 12. According to an aspect of the present technique, this would lead to a dynamic balance term of 2 klb/hr. This dynamic balance term may be due to an increase in catalyst activity, high inventory of monomer within the reactor 12, problems associated with feed, and the like. However, shortly after this imbalance is corrected or returns to normal (either through human operator and/or controller 20 intervention or over time), the production may decrease to about 30 klb/hr, resulting in a dynamic balance term of about zero. In embodiments where the dynamic balance term increases (or has a non-zero value), the likelihood of a reactor foul may increase as well. Thus, by introducing features to control the dynamic balance term into the system 10, it may be possible to implement a real-time control solution into the reactor system 10 that models and, therefore, predicts a reactor foul may occur. It is also an object of the present embodiments to provide a method and system for controlling such dynamic balances by adjusting feeds into the reactor system 10 substantially instantaneously to mitigate undesired future predicted responses (e.g., a reactor foul) from occurring.

Figure 11:
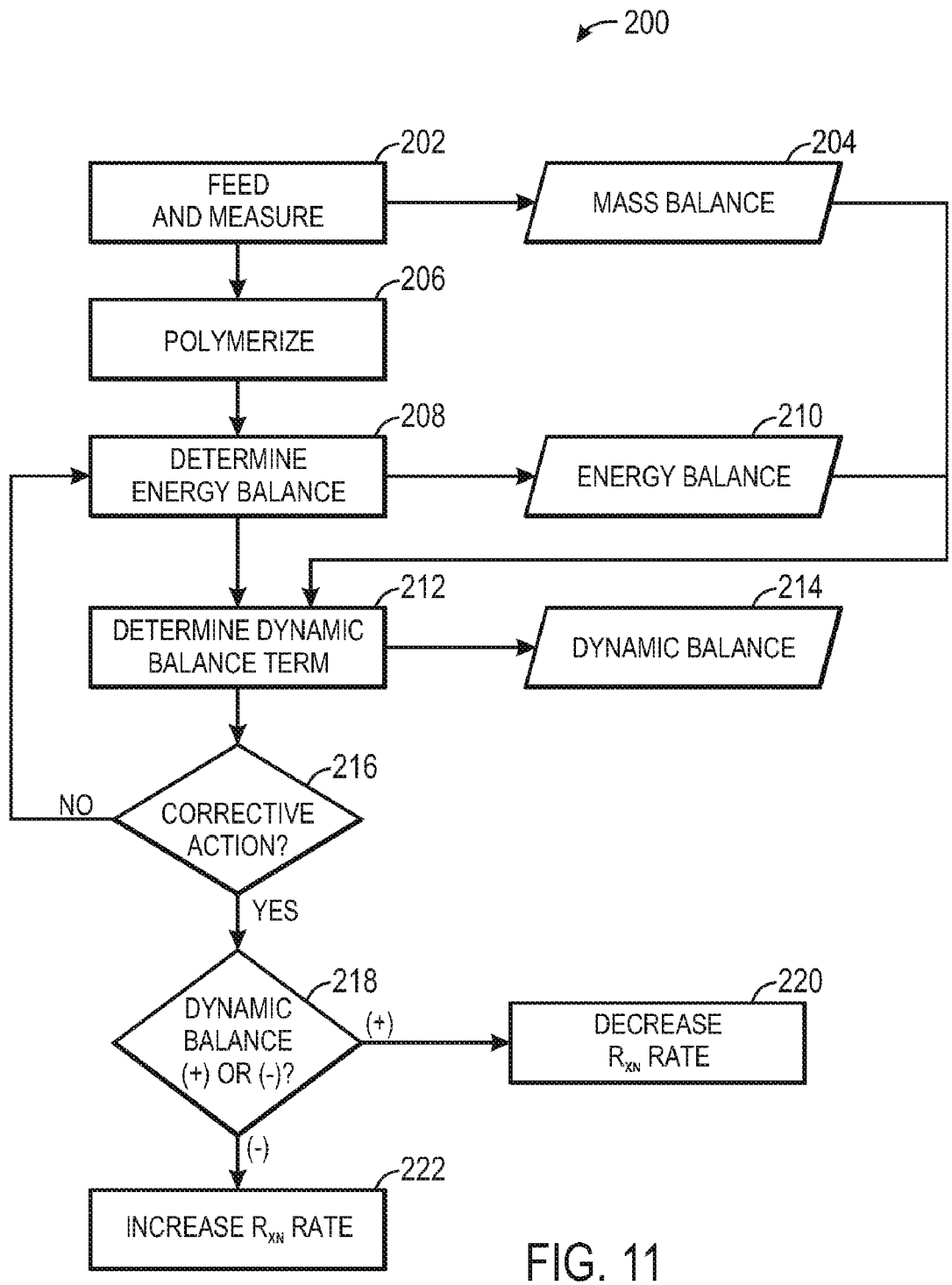
FIG. 11 is a process flow diagram of a method for controlling dynamic balances of a polymerization system, in accordance with an aspect of the present disclosure.

The present technique provides a method 200 illustrated in FIG. 11 that generally includes determining whether a dynamic balance exists during a polymerization reaction and making adjustments to one or more polymerization components accordingly. The polymerization reaction components may include diluent, monomer, catalyst, co-catalyst, activator, additive, and the like. In some embodiments, some or all polymerization components may be mixed before delivery to the reactor 12. Nevertheless, in total, the amount of steady-state raw material feed may be considered a feed measurement performed in block 202. In some embodiments, the feed measurement may be considered a mass balance 204.

One or more of the polymerization components (e.g., monomer, comonomer) are then polymerized (block 206). As described with respect to FIG. 1, the polymerization system 10 may include features used to maintain a certain temperature or temperature range within the reactor 12, such as providing a coolant to the outside of one or more reaction zones (e.g., cooling jackets 22). Thus, as the reactor 12 is substantially maintained at a setpoint, directly measuring the rate of the reaction may be difficult. Accordingly, measuring the coolant system 14 response to the heat generated by the polymerization reaction may serve to represent the instantaneous reaction rate present in the reactor 12. Thus, the method 200 provides one embodiment where the coolant system 14 response to the heat generated by the polymerization reaction is measured (block 208). In some embodiments, the temperature and/or amount of a coolant provided to the cooling jackets 22 may be the representative measurement. Indeed, in accordance with the present technique, the instantaneous reaction rate measured may be an energy balance term 210.

The method 200 further takes into account a relationship between the mass balance 204 and the energy balance 210 to determine if corrective action is appropriate (block 212). The above relationship may be the difference between the energy balance 210 and the mass balance 204, such that the result may be a dynamic balance 214. In some embodiments, the dynamic balance 214 may be determined by other mathematical relationships between the energy balance 210 and the mass balance 204 in addition to or in lieu of a subtraction function.

Nevertheless, the dynamic balance 214 may be used to determine (block 216) whether the dynamic balance term indicates that the polymerization reactor 12 is in an optimal operational range. The value of the dynamic balance is then used to determine whether the polymerization reactor 12 is experiencing too much reaction, or whether the polymerization reactor 12 is experiencing too little reaction (block 218). In view of the above discussion with respect to dynamic balance, the dynamic balance 214 may represent these states when it is greater than about zero or less than about zero, respectively.

In some embodiments, the degree of deviation of the dynamic balance 214 from approximately zero may provide an indication as to what extent of corrective action is appropriate. In embodiments where the dynamic balance term is greater than zero, which may be indicative of too much reaction, the method 200 may call for a corrective action that may lower the reaction rate (block 220). Lowering the reaction rate may be performed by any or a combination of decreasing the rate of addition of catalyst, increasing the rate of diluent feed, decreasing the amount of monomer provided to the reactor 12, or adjusting the amount of coolant provided to the cooling jackets 22. In accordance with the present technique, the appropriate corrective action or combination of corrective actions may be determined by a predictive model or a MCS, and may depend on a number of factors including, for example, the current monomer weight percent, the instant solids weight percent, and the power consumption by the circulating pump, to name a few.

In embodiments where the dynamic balance 214 is less than zero, any one or a combination of control actions may be performed that may increase the rate of reaction (block 222). For example, a predictive model or MCS may provide for the human operator and/or controller 20 to increase the catalyst feed rate, decrease the diluent feed rate, and/or increase the monomer feed rate. As mentioned, the nature and extent of the corrective action may depend on a number of factors, including those listed above.

Figure 12:
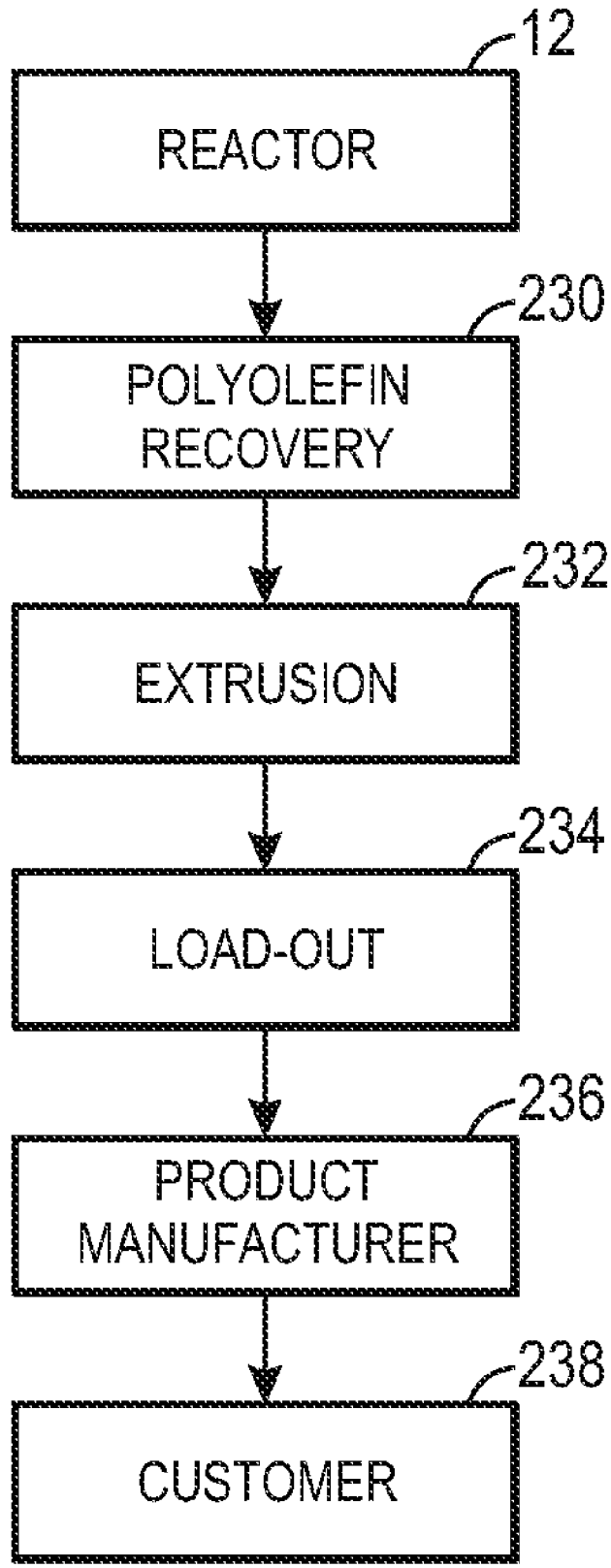
FIG. 12 is a block diagram illustrating steps in the post-processing of polyolefins produced in a polymerization reactor, in accordance with an aspect of the present disclosure.

While the preceding discussion related to the production of polyolefins, such as polyethylene, in the polymerization reactor 12, the polyolefins produced in the reactor 12 may be further processed. For example, referring now to FIG. 12, the dried polyolefin may be processed to remove unreacted reactants and catalyst in a polyolefin recovery system 230, which may include various subsystems such as monomer recovery columns, flash vessels, and cyclones. The purified polyolefin may be provided to an extrusion system 232 where the polyolefin product is typically extruded to produce polymer pellets with the desired mechanical, physical, and melt characteristics. Additives, such as UV inhibitors and peroxides, may be added to the polyolefin product prior to or during extrusion to impart desired characteristics to the extruded polymer pellets.

The resulting polyolefin pellets may then be transported to a product load-out area 234 where the pellets may be stored, blended with other pellets and/or loaded into railcars, trucks, bags, and so forth, for distribution to product manufacturers 236. In the case of polyethylene, pellets shipped to product manufacturers 236 may include low density polyethylene (LDPE), linear low density polyethylene (LLDPE), medium density polyethylene (MDPE), high density polyethylene (HDPE), and enhanced polyethylene (e.g., LF grade polyethylene). The various types and grades of polyethylene pellets may be marketed, for example, under the brand names Marlex® polyethylene or MarFlex™ polyethylene of Chevron-Phillips Chemical Company, LP, of The Woodlands, Tex., USA.

The polyolefin (e.g., polyethylene) pellets may be used in the manufacture of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and a variety of containers and plastic products. Further, it should be emphasized that polyolefins other than polyethylene, such as polypropylene, may form such components and products via the processes discussed below.

In addition, the products and components formed from polyolefin (e.g., polyethylene) pellets may be further processed and assembled by the manufacturer 186 for distribution and sale to a consumer, such as a customer 238. For example, a polyethylene milk bottle may be filled with milk for distribution to the consumer, or a polyolefin fuel tank may be assembled into an automobile for distribution and sale to the consumer.

ADDITIONAL DESCRIPTION

The following clauses are offered as further description of the present disclosure:

1. A method of operating a polymerization reactor, comprising the acts of: analyzing a set of operational data within the polymerization reactor with a controller to determine a pressure and a flow of solid polymer particles circulating through the polymerization reactor; monitoring the pressure and the flow over time and identifying a predictive indicator of an incipient reactor foul; and adjusting a polymerization reaction condition with the controller in response to the predictive indicator.

2. The method according to clause 1, wherein monitoring the pressure and the flow over time comprises plotting the pressure and the flow to generate a system curve, and monitoring the system curve over time in relation to a pump curve to determine an operating range or point.

3. The method according to clause 2, wherein the operating range or point comprises an intersection of the system curve with the pump curve.

4. The method according to clause or clause 3, wherein monitoring the pressure and the flow over time comprises monitoring a distance traveled by the operating range or point along a path constrained by the pump curve over time.

5. The method according to clauses 2 to 4, wherein identifying the predictive indicator comprises identification of a distance traveled by the operating range or point meeting or exceeding a threshold value defined by a predictive model.

6. The method according to clauses 2 to 5, wherein monitoring the pressure and the flow over time comprises monitoring changes in a standard deviation of a set of distances traveled by the operating range or point along a path constrained by the pump curve in a given amount of time.

7. The method according to any preceding clause, wherein the predictive indicator comprises identification of a change in the standard deviation of at least 20% over a period of about 5 minutes.

8. The method according to any preceding clause, wherein the operational data comprises any one or a combination of densitometer measurements, power consumption by the circulating pump, circulating pump differential pressure measurements or flow meter measurements.

9. A method of predicting a polymerization reactor foul, comprising the acts of: importing polymerization reactor operational data from reactor sensors into a processor, the polymerization reactor operational data comprising measurements indicative of pressure and flow of solid polymer particles circulating through a polymerization reactor; generating a system curve from the polymerization reactor operational data with the processor; monitoring the system curve for a predictive indicator of an incipient reactor foul with the processor; and providing a user-perceivable indication when the predictive indicator is identified.

10. The method according to clause 9, wherein the polymerization reactor operational data further comprises any one or a combination of a dynamic balance term, a rate of change of solids weight percent within the polymerization reactor, or a rate of change of monomer weight percent within the polymerization reactor.

11. The method according to either of clauses 9 or 10, wherein the predictive indicator comprises a rate of change of solids weight percent or monomer weight percent meeting or exceeding a set value defined by a predictive model constructed from past polymerization runs.

12. The method according to any of clauses 9-11, wherein the predictive indicator comprises an increase in the dynamic balance term.

13. The method according to any of clauses 9-12, wherein monitoring the system curve comprises monitoring the movement of the system curve over time compared to a pump curve constructed from pump data or a predictive model constructed from past polymerization runs.

14. The method according to clause 13, wherein monitoring the movement of the system curve over time compared to the pump curve comprises identifying an intersection of the system curve and the pump curve, the intersection being an operating point or range, and monitoring the movement of the operating point or range along a path substantially constrained by the pump curve over time.

15. The method according to any of clauses 9-14, wherein the predictive indicator comprises a distance traveled by the operating point or range meeting or exceeding a threshold value determined from past polymerization data.

16. A polymerization reactor monitoring and control system, comprising: a processor configured to identify a predictive indicator of an incipient reactor foul by analyzing reactor operational data; and reactor control circuitry coupled to the processor and capable of adjusting a polymerization reaction condition in response to the analysis of the reactor operational data; wherein the analysis of the reactor operational data comprises an analysis of pressure and a flow of solid polymer particles circulating through the polymerization reactor.

17. The polymerization reactor monitoring and control system according to clause 16, wherein the analysis of the reactor operational data comprises a pump curve-system curve analysis and any one or a combination of a dynamic balance term analysis, an analysis of a rate of change of solids weight percent within the polymerization reactor, or an analysis of a rate of change of monomer weight percent within the polymerization reactor.

18. The polymerization reactor monitoring and control system according to either of clauses 16 or 17, wherein the reactor control circuitry comprises valve control circuitry capable of adjusting a valve configured to control a flow of any one or a combination of diluent, monomer, comonomer, reaction modifier, catalyst or cocatalyst into the polymerization reactor or the flow of coolant into the polymerization reactor cooling jackets.

19. The polymerization reactor monitoring and control system according to any of clauses 16-18, wherein the valve control circuitry is configured to adjust the valve regardless of the instantaneous values of the solids weight percent and/or the monomer weight percent.

20. The polymerization reactor monitoring and control system according to any of clauses 16-19, comprising a memory circuit coupled to the processor and storing a predictive model accessible by the processor for identifying the predictive indicator, wherein the predictive model has been constructed from data collected during past polymerization runs.

21. The polymerization reactor monitoring and control system according to clause 20, wherein the memory circuit stores a series of pre-determined responses to be performed by the reactor control circuitry for avoiding the incipient reactor foul, and the pre-determined responses are defined by the predictive model.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method of operating a polymerization reactor, comprising the acts of:
    importing polymerization reactor operational data from reactor sensors into a processor, the polymerization reactor operational data comprising measurements indicative of pressure and flow of solid polymer particles circulating through a polymerization reactor;
    generating a system curve from the polymerization reactor operational data with the processor, wherein generating the system curve comprises plotting the pressure and flow of the solid polymer particles circulating through the polymerization reactor;
    monitoring the system curve for a predictive indicator of an incipient reactor foul with the processor, wherein monitoring the system curve comprises identifying an intersection of the system curve and a pump curve constructed from pump data of a circulating pump for the polymerization reactor, the intersection being an operating point or range, and monitoring a distance traveled by the operating point or range along a path substantially constrained by the pump curve over time;
    identifying the predictive indicator based on the distance traveled by the operating point or range over time; and
    adjusting an operating parameter of the polymerization reactor with a controller in response to the predictive indicator.

2. The method of claim 1, further comprising adjusting the operating parameter or another operating parameter in response to an additional predictive indicator based on any one or a combination of a dynamic balance term, a rate of change of solids weight percent within the polymerization reactor, or a rate of change of monomer weight percent within the polymerization reactor.

3. The method of claim 2, wherein the additional predictive indicator comprises a rate of change of solids weight percent or monomer weight percent meeting or exceeding a set value defined by a predictive model constructed from past polymerization runs.

4. The method of claim 2, wherein the additional predictive indicator comprises an increase in a dynamic balance term.

5. The method of claim 1, wherein the predictive indicator is identified when the distance traveled by the operating point or range meets or exceeds a threshold value determined from past polymerization data.

6. The method of claim 1, wherein monitoring the distance of the operating point or range comprises monitoring a standard deviation of a set of distances traveled by the operating point or range along the path substantially constrained by the pump curve in a given amount of time.

7. The method of claim 6, wherein the predictive indicator comprises a change in the standard deviation of at least 20% over a period of about 5 minutes.

8. The method of claim 1, wherein the predictive indicator is identified when the distance traveled by the operating point or range along the path in a given amount of time exceeds a threshold value defined by a predictive model.

9. The method of claim 1, wherein the polymerization reactor operational data comprises any one or a combination of densitometer measurements, power consumption by the circulating pump, circulating pump differential pressure measurements or flow meter measurements.

* * * * *